Dec. 16, 1952 C. H. HOEPPNER 2,622,151

PULSE AMPLITUDE DISCRIMINATOR CIRCUIT

Filed Aug. 3, 1945 2 SHEETS—SHEET 1

PULSE RECEIVING SYSTEM

Inventor
CONRAD. H. HOEPPNER

By Ralph L Chappell

Attorney

Inventor
CONRAD H. HOEPPNER

By [signature]

Attorney

Patented Dec. 16, 1952

2,622,151

UNITED STATES PATENT OFFICE 2,622,151

PULSE AMPLITUDE DISCRIMINATOR CIRCUIT

Conrad H. Hoeppner, Washington, D. C.

Application August 3, 1945, Serial No. 608,805

1 Claim. (Cl. 178—44)

(Granted under the act of March 3, 1883, as amended April 30, 1928; 370 O. G. 757)

This invention relates broadly to pulse responsive electronic circuits and in particular to an electronic circuit for selective pulse redintegration.

In radio, radar, television, and other electronic fields, it frequently occurs that a number of different potential variations may exist at the input to a component electronic circuit either fortuitously or by intention. If all of such variations, and more particularly all of such variations in unqualified form are not to be impressed upon the component circuit, it is necessary to provide a selective intervening circuit. In order to accomplish the desired functions this intervening circuit should have the ability, not only to reject certain undesired variations, but also to so modify the remaining variations that they reach the component circuit in possession of the characteristics most suitable for its operation.

It is an object of this invention to provide a selective pulse redintegrator.

It is another object of this invention to provide a circuit which can be employed between a source of potential variations and the receiver thereof as an intervening circuit which not only shields certain undesired variations from the receiver but also so modifies the remaining variations that they reach the receiver in a form most suitable for its operation.

It is another object of this invention to provide a circuit, which, receiving signals having various different characteristics, rejects those of such signals having certain amplitude characteristics and produces at its output, in response to the signals not so rejected signals which differ essentially only in the characteristic of time duration.

It is another object of this invention to provide a circuit whereby a wavetrain, originally comprising distinct electrical impulses but subsequently modulated by random noise, may be demodulated and a substantial facsimile of the original wavetrain produced.

It is another object of this invention to provide a means for suppressing random noise signals from the output of an ordinary pulse type receiver system.

Other objects and features of this invention will become apparent upon a careful consideration of the following detailed description when taken together with the accompanying drawings in which.

Figure 1:
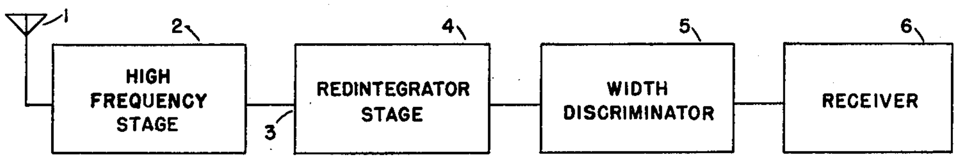
Fig. 1 is a simple block diagram of a pulse receiving system utilizing one embodiment of this invention.

Reference is now had in particular to Fig. 1 which is illustrative of a pulse receiving system wherein a redintegrator is employed to restore to a received wavetrain of pulses the original transmitted pulse time duration characteristics and to free the wave train from random noise modulation. Pulses or bursts of high frequency energy received by antenna 1, amplified and detected by high frequency stage 2 are impressed, in the form of the negative half of the envelope of the high frequency pulses of energy, to input 3 of redintegrator stage 4. Since pulses of high frequency energy reaching antenna 1 may comprise not only a desired signal but also man-made interfering signals and atmospheric noise of a frequency which high frequency stage 2 will not reject, and since high frequency stage 2 may itself be a source of intefering signals, it is one function of redintegrator 4 to shield from discriminator 5 all pulses not exceeding a certain signal strength. Since width discriminator 5, which is designed to remove all video signals not having certain time duration characteristics from the input to receiver 6, operates most satisfactorily when its input signals are comprised of pulses of uniform amplitudes and steep leading and trailing edges so as to reduce signal differences substantially to one of time duration, it is another function of redintegrator stage 4 to endow the signals which it does not reject with the characteristics representative of satisfactory input to width discriminator 5.

In general, the selective redintegration taught by this invention is accomplished by so biasing a vacuum tube that input signals exceeding a predetermined amplitude drive the tube from one steady state of conduction to another steady state of conduction for the duration of such signals. Input signals not achieving the predetermined amplitude, which in the pulse receiving system of Fig. 1 represent, in general, atmospheric and receiver generated noise bursts in the absence of signals from a pulse transmitter, do not disturb the existing steady state of the tube. Thus the redintegrator removes from the wave train undesired noise signals. Input signals exceeding the predetermined amplitude by an appreciable amount drive the tube from the existing state into a second steady state to thereby cause, at the redintegrator output, output signals of uniform amplitude having time duration characteristics and spacing determined by such input signals.

Figure 2:
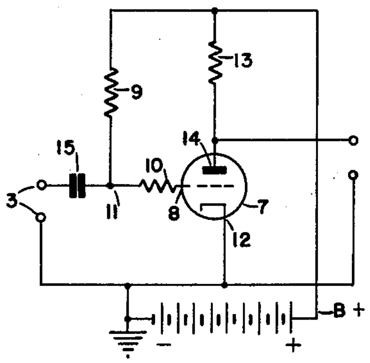
Fig. 2 is the circuit diagram of one embodiment of this invention.

In particular, vacuum tube 7 of Fig. 2, to which reference is now had, has its control grid 8 so connected to positive B+ potential that, in the absence of signals at input 3, grid current flows from B+ to ground through the grid to cathode resistance of tube 7. This grid current also flows through series connected resistors 9 and 10 to establish a positive potential at juncture 11. Resistors 9 and 10 may be so chosen with respect to the grid to cathode resistance of tube 7 that the voltage drop across this latter resistance is a negligible part of the total from B+ to ground. Furthermore, resistors 9 and 10 may be so chosen with respect to each other that the potential at juncture 11 with respect to ground in the absence of signals is slightly greater than the voltage level created by atmospheric and receiver noise alone. There thus exists between juncture 11 and grid 8 a potential difference which must be overcome by a negative signal at input 3 before grid 8 can be driven below cathode 12 so as to affect the flow of plate current in tube 7. As long as this potential difference is not overcome by such a negative signal at input 3, the plate current flow in tube 7 and hence the voltage across tube 7 does not change from a steady condition to any appreciable extent.

Coupling capacitor 15 may be chosen of such a value that, in combination with resistor 9 there is provided a long time constant coupling circuit which prevents the accumulation of any appreciable charge on capacitor 15 during any applied signal. For example, a typical triode has a grid to cathode resistance of 1000 ohms under the aforementioned conditions. With a B+ potential of 150 volts and resistor 9 equal to one megohm and resistor 10 equal to 27,000 ohms, the voltage division is such that juncture 11 is at +4 volts and grid 8 at only +0.15 volt. A voltage drop at juncture 11 of 4 volts therefore corresponds to a voltage drop of only 0.15 volt at grid 8 which, by proper choice of plate resistor 13 and tube 7, causes very little change at plate 14.

Tube 7 may be chosen a high-mu triode with sharp cutoff characteristics so that, once an input signal has overcome the potential difference between juncture 11 and ground, only a small additional negative voltage at grid 8 drives tube 7 from a steady full conduction state to a steady non-conduction state. Any additional negative excursion beyond the point required to cut off plate current in tube 7 is, of course, ineffective insofar as further change in plate current is concerned. For example, a 6SF5 triode with the aforementioned B+ and resistor values and with a plate resistor 13 of 50,000 ohms conducts negligible plate current with a grid bias of −2.5 volts. With such circuit components a negative signal of 4 volts amplitude at input 3 causes very little change in potential at plate 14 while a negative signal of 6.5 volts amplitude or greater causes an increase at plate 14 from approximately 80 volts to 150 volts (B+).

Figure 2A:
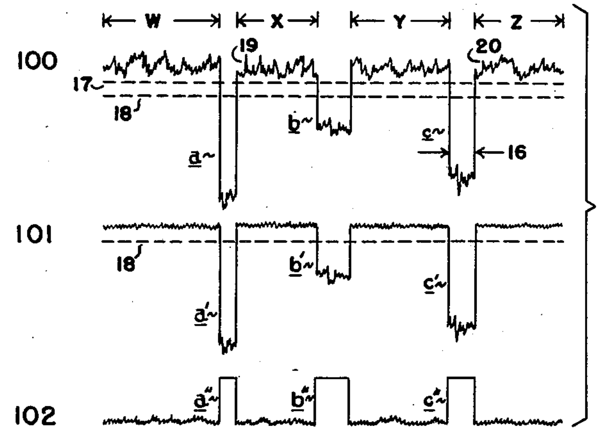
Fig. 2A is a series of waveforms useful in explaining the operation of the circuit of Fig. 2.

The waveforms shown in Fig. 2A are descriptive of this action and reference is now had to waveform 100 of that figure. This waveform represents the video output of high frequency stage 2 and comprises, as in regions *w*, *x*, *y*, and *z* intervals during which only atmospheric disturbances, weak signals, etc., reach antenna 1. These, combined with locally generated disturbances, constitute noise in the video output. Pulses *a*, *b*, and *c* represent (for example) the output of three different remote transmitters operating on the same frequency but employing the different pulse durations illustrated. The width discriminator 5 of Fig. 1 may be of a type designed to remove all video signals except those having a duration equal to that of pulse *c* above the noise level as at 16. It frequently occurs that such discriminators are amplitude sensitive and function in a reliable manner only when a definite limit is placed on the amplitude of the signals which are applied to them. Thus a signal of lesser duration but greater amplitude, such as pulse *a* or a signal of greater duration but lesser amplitude such as pulse *b* might comprise the discriminatory function of component 5.

Waveform 101 is representative of the variations which appear at grid 8 of tube 7 in response to waveform 100. The action of grid current flow through resistor 10 and the grid-cathode resistance of tube 7 has been substantially to eliminate all incoming signals not reaching potential level 17 superposed on waveform 100. Potential level 17 is representative of the potential established under quiescent conditions at juncture 11 as hereinbefore described. Of particular interest in waveform 101 is the fact that the effect of noise in broadening the base of the pulses has also been eliminated. For example, a burst of noise coincidental with the trailing edge of pulse *a* as at 19 on waveform 100 could stretch pulse *a* until it assumed, at its base, the same width as desired pulse *c* at 16. Further, a similar burst of noise could stretch desired pulse *c*, as at 20, until it assumed, at its base, a width which would cause it to be rejected rather than accepted by discriminator 5.

By the action described, the applied waveform 100, consisting of pulses *a*, *b*, and *c* and accompanying noise appears at grid 8 as waveform 101 consisting of pulses $a'$, $b'$ and $c'$. Noise present in the absence of pulses, and pulse stretching have been substantially eliminated.

Also superposed on waveforms 100 and 101 is potential level 18 which is representative of the grid potential at which plate current no longer can flow in tube 7. Thus, the variation in the amplitude of pulses $a'$, $b'$ and $c'$ is meaningless insofar as the effect upon plate current flow is concerned. There therefore appears at plate 14 of tube 7 waveform 102 comprising amplitude limited pulses $a''$, $b''$, and $c''$ derived from those elements of pulses *a*, *b*, and *c* lying between potential level 17 and potential level 18. The only substantial difference between these pulses lies in the characteristic of time duration. Thus width discriminator 5 of Fig. 1 receives signals which are free from such compromising factors as noise, pulse stretching and amplitude variations. The redintegrator has removed random noise, demodulated the pulses, limited the pulse amplitude and restored the true time duration characteristics of the incoming pulses.

Figure 3:
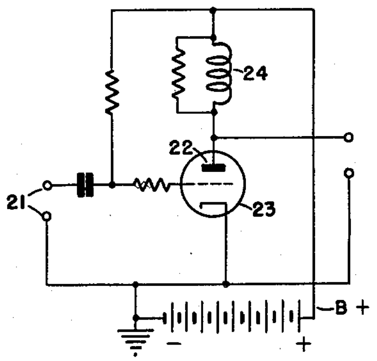
Fig. 3 is the circuit diagram of a variant embodiment of this invention.
Figure 3A:
Fig. 3A is a series of waveforms useful in explaining the operation of the circuit of Fig. 3.

A variant embodiment which invests the redintegrator with an additional function, that of differentiation, is shown in Fig. 3. In this circuit, the plate load is essentially inductive rather than resistive as in the circuit of Fig. 2. When incoming pulses, such as *a*, *b*, and *c* are applied at input 21, the rectangular pulses tending to appear at plate 22 of tube 23 are resolved, by the action of inductance 24 into positive and negative pulses corresponding to leading and trailing edges respectively of the applied pulses. The differentiation produced pulses are all of the same amplitude and are spaced in accordance with the applied pulse duration. This action is illustrated in Fig. 3A in which waveform 200 is representative of a series of video signals applied to terminals 21 of Fig. 3. This applied waveform is essentially the same as waveform 100 applied to the circuit of Fig. 2 so that the same clipping and limiting action occurs as was previously described. At plate 22 of tube 23 of Fig. 3, however, there appears the differentiated waveform 201. Similarly, the redintegrator may be invested with the optional additional function of integration merely by connecting a capacitor of proper value across resistor 13 of Fig. 2 or from plate 14 to ground in Fig. 2. The redintegrator output thus obtained is shown in waveform 202 of Fig. 3A.

A somewhat more simple means of investing the redintegrator circuit with the optional function of integration is to use a large value for resistor 13 of Fig. 2. In such a case, resistor 13, in combination with the distributed capacitance of the circuit and the output capacitance of tube 7, comprises a long time constant circuit which will yield an almost linear increase in voltage at plate 14 of tube 7 in the manner shown in waveform 202. This arrangement has the advantage that the low angle load line which results from the use of a large resistor 13 provides greatly reduced amplification in the positive grid potential region. Thus, noise signals not only are reduced by the voltage division at the grid as hereinbefore described but receive greatly reduced amplification since they serve only to vary the grid potential in the positive region.

Figure 4:
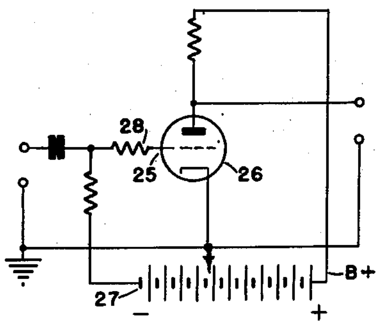
Fig. 4 is the circuit diagram of a second variant embodiment of this invention.
Figure 4A:
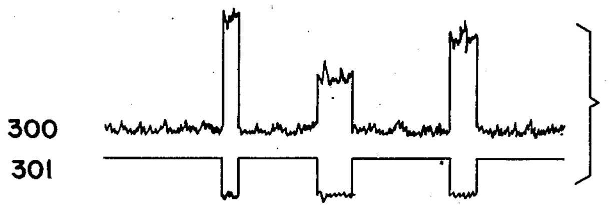
Fig. 4A is a series of waveforms useful in explaining the operation of the circuit of Fig. 4.

A second variant embodiment is shown in Fig. 4, which is responsive to positive rather than negative video signals. In the circuit of Fig. 4, the principle of operation is essentially the same as in the circuit of Fig. 2 except that noise clipping and elimination of pulse stretching is accomplished by biasing grid 25 of tube 26 a suitable amount below plate current cutoff by means of negative potential 27 and except that amplitude limiting is accomplished by the grid current voltage drop across resistor 28. A typical input waveform is illustrated by 300 and the resulting output by waveform 301 of Fig. 4A.

Where a low impedance output is desirable, the circuit may be changed so as to have the resistance, inductance or capacitance elements and output terminal associated with the cathode rather than the anode circuit of the vacuum tube. These, however, are purely matters to be governed by the requirements of a particular application and represent variations which will readily occur to those well versed in the art.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalty thereon or therefor.

What is claimed is:

A pulse amplitude discriminator circuit for rejecting weak signal components comprising a vacuum tube having an anode, a cathode and a grid, a pair of resistances one of which is much larger than the other connected in series, the free end of the smaller of said resistances of said series connection connected to the grid of said tube, a source of direct potential connected between the other end of said series connection and said cathode to provide a positive reference potential at the junction of said resistances, an input connection for applying negative input pulses directly between the junction of said resistances and the cathode whereby input pulses exceeding said reference potential in amplitude by a predetermined amount causes said tube to pass from one state of conduction to a second, and means for deriving output pulses from the anode of said tube.

CONRAD H. HOEPPNER.

REFERENCES CITED

The following references are of record in the file of this patent:

UNITED STATES PATENTS

| Number | Name | Date |
|---|---|---|
| 1,483,172 | Gannett | Feb. 12, 1924 |
| 1,916,404 | Barton | July 4, 1933 |
| 2,208,422 | Hugon | July 16, 1940 |
| 2,276,565 | Crosby | Mar. 17, 1942 |
| 2,347,008 | Vance | Apr. 18, 1944 |
| 2,446,945 | Morton et al. | Aug. 10, 1948 |